United States Patent
Ritthaler

(10) Patent No.: US 9,352,640 B2
(45) Date of Patent: May 31, 2016

(54) VEHICLE ROOF

(71) Applicant: AUDI AG, Ingolstadt (DE)

(72) Inventor: Kurt Ritthaler, Böhmfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/440,939

(22) PCT Filed: Oct. 29, 2013

(86) PCT No.: PCT/EP2013/003245
§ 371 (c)(1),
(2) Date: May 6, 2015

(87) PCT Pub. No.: WO2014/072032
PCT Pub. Date: May 15, 2014

(65) Prior Publication Data
US 2015/0298529 A1 Oct. 22, 2015

(30) Foreign Application Priority Data

Nov. 7, 2012 (DE) .......................... 10 2012 021 850

(51) Int. Cl.
*B60J 7/22* (2006.01)
*B60J 7/043* (2006.01)
*B60J 7/00* (2006.01)
*B60J 7/057* (2006.01)
*B60R 13/08* (2006.01)
*B62D 29/04* (2006.01)

(52) U.S. Cl.
CPC ................ *B60J 7/043* (2013.01); *B60J 7/0046* (2013.01); *B60J 7/0435* (2013.01); *B60J 7/057* (2013.01); *B60R 13/08* (2013.01); *B62D 29/043* (2013.01)

(58) Field of Classification Search
CPC ........................................................ B60J 7/0046
USPC ................... 296/217, 216.01–224, 216.09, 296/216.06–216.08
See application file for complete search history.

(56) References Cited

U.S. PATENT DOCUMENTS

| | | | |
|---|---|---|---|
| 6,942,288 B2* | 9/2005 | Paetz | B29C 44/1214 296/211 |
| 7,862,109 B2* | 1/2011 | Geerets | B60J 7/0046 296/217 |
| 2008/0036247 A1* | 2/2008 | Park | B60J 7/0046 296/217 |
| 2014/0319882 A1* | 10/2014 | Farber | B60J 7/0046 296/217 |

FOREIGN PATENT DOCUMENTS

| | | | |
|---|---|---|---|
| DE | 199 46 926 | | 10/2000 |
| DE | 10304506 | * | 8/2004 |
| DE | 102007056797 | * | 4/2009 |
| DE | 102008015669 B3 | | 10/2009 |
| DE | 102011119991 B3 | | 5/2012 |
| EP | 0 442 773 A1 | | 8/1991 |

OTHER PUBLICATIONS

International Search Report issued by the European Patent Office in International Application PCT/EP2013/003245.

* cited by examiner

*Primary Examiner* — Dennis H Pedder
(74) *Attorney, Agent, or Firm* — Henry M. Feiereisen LLC

(57) ABSTRACT

The invention relates to a vehicle roof (1) with a roof opening (3) which is closable by a roof element (4), and a side outer panel (7) which, in an erected open position of the roof element (4), covers a lateral gap between the roof element (4) and a side wall frame (5). According to the invention, the side outer panel (7) is mounted pivotably in the longitudinal direction (x) of the vehicle.

18 Claims, 2 Drawing Sheets

VEHICLE ROOF

CROSS-REFERENCES TO RELATED APPLICATIONS

This application is the U.S. National Stage of International Application No. PCT/EP2013/003245, filed Oct. 29, 2013, which designated the United States and has been published as International Publication No. WO 2014/072032 and which claims the priority of German Patent Application, Serial No. 10 2012 021 850.8, filed Nov. 7, 2012, pursuant to 35 U.S.C. 119(a)-(d).

BACKGROUND OF THE INVENTION

The invention relates to a vehicle roof.

DE 10 2008 015 669 B3 shows a vehicle roof with a roof opening which is closeable by a roof element, and a side outer panel which covers a lateral gap between the roof element and a side wall frame, when the roof panel assumes a popped-up open position. The side outer panel is received in a panel box and swings vertically upwards towards the roof element in the manner of a fan panel, wherein a rotation axis extends transversely to the vehicle longitudinal axis. Apart of increased construction costs, there is need for greater installation heights and a relatively deep panel box for these fan-shaped panels.

DE 199 46 926 C5 discloses an inner paneling in the form of a side inner panel for a vehicle roof to provide in addition to safety and protective functions against pollution, in particular sight protection for the vehicle occupants. In closed position, the side inner panel does not bear upon the movable roof element itself, but on a guide element for the roof element. When being transferred to full open position, in which the roof element lies completely below a tail portion, the side inner panel is no longer acted upon by the roof element and there is no deflecting force on the inner side panel. Only during the transfer movement is there an upper free portion of the side inner panel that bears upon an underside of the roof element, so that the side mechanics is covered towards the interior space and a sight protection is established. The side inner panel is configured pivotally movable and tiltable in the vehicle longitudinal direction and provides a safety guard and sight protection and has technically little relation to a roof element, which can be outwardly popped-up for providing an outer seal, a so-called aero panel provided for aeroacoustics functions on an outer side of the roof element.

SUMMARY OF THE INVENTION

The object of the invention is to provide a vehicle roof with a side outer panel, which has a simple and compact structure that advantageously requires only very little installation height for the side outer panel.

According to the invention, this object is achieved by providing a vehicle roof with a roof opening which is closeable by a pop-up roof element, and a side outer panel which covers a lateral gap between the roof element and a side wall frame in a popped-up open position of the roof element, wherein the side outer panel is mounted for pivotal movement in a vehicle longitudinal direction. Advantageous embodiments and refinements of the invention are set forth in the dependent claims.

Embodiments according to the invention advantageously develop little noise during travel as a result of the side outer panel.

According to an advantageous configuration of the vehicle roof according to the invention, the side outer panel is continuously pressed by a spring force towards the roof element to maintain good aeroacoustics also when the roof element is popped-up.

According to a further advantageous embodiment of the vehicle roof, the side outer panel rests upon a contact zone, configured as a sliding surface, of the roof element. The contact zone, configured as a sliding surface, can, preferably, be formed from a plastic component of the roof element. As the roof element normally has a glass cover, which is molded around by PUR plastic, the PUR plastic forms the contact zone, configured as a sliding surface, on the underside of the roof element. When a roof element is involved which has not been molded around with PUR plastic, a corresponding plastic part can be attached to the underside of the roof element for formation of the contact zone, configured as a sliding surface.

According to a further advantageous configuration of the vehicle roof, the side outer panel is supported by at least two bearing points in spaced-apart vehicle longitudinal direction on the side wall frame or on a mounting frame.

According to a further advantageous configuration of the vehicle roof, the side outer panel is inclined relative to the horizontal at a predetermined angle in the range of 50 to 70 degrees, preferably at an angle of approximately 60 degrees, when the roof element is popped-up, to thereby result in a particularly low noise level. Furthermore, a stop may be provided to limit the inclination angle of the side outer panel to a predefined maximum opening angle of about 70 degrees. This advantageously prevents the tiltable side outer panel from interfering with the movement as the roof element closes.

According to a further advantageous configuration of the vehicle roof, the side outer panel is positioned in the popped-up open position of the roof element at a predefined distance from an outer periphery of the roof element on an underside of the roof element, thereby again resulting in a particularly low noise level. In this case, a predefined distance in the range of 20 to 40 mm, preferably of about 25 mm, has proven advantageous. The distance is measured in the rear section or at a rear edge of the roof element. Since the side outer panel has a wedge-shaped configuration, the overhang in the front area of the roof element is smaller.

According to a further advantageous configuration of the vehicle roof, the roof member receives a seal which is secured to an underside of the roof element and upon which the side outer panel rests laterally in the popped-up open position of the roof element. As a result of this seal, the noise level is further enhanced. In a simple way, the seal can be configured as an elastic foam element.

According to a further advantageous configuration of the vehicle roof, a frame seal is provided between the side wall frame and the side outer panel to form a good joint seal of the roof element on the side frame in closed position and to further assume the function of an aeroacoustics seal for the tilted side outer panel against the side wall frame. Therefore, the frame seal is able to seal against the side outer panel and the side wall frame in the popped-up open position of the roof element, and against the outer periphery of the roof element and the side wall frame in the closed position of the roof element. The frame seal can, for example, be arranged on the mounting frame or on the side wall frame.

According to a further advantageous configuration of the vehicle roof, the side outer panel can be designed as a one-piece or multi-piece sheet metal part. As an alternative, the side outer panel can be designed as a one-piece or multi-piece plastic part. The configuration as sheet metal part allows a particularly compact design, since a smaller wall thickness can be selected than in a configuration as a plastic component.

BRIEF DESCRIPTION OF THE DRAWING

Advantageous embodiments of the invention are illustrated in the drawing and are described below.

It is shown in.

DETAILED DESCRIPTION OF PREFERRED EMBODIMENTS

Figure 1:
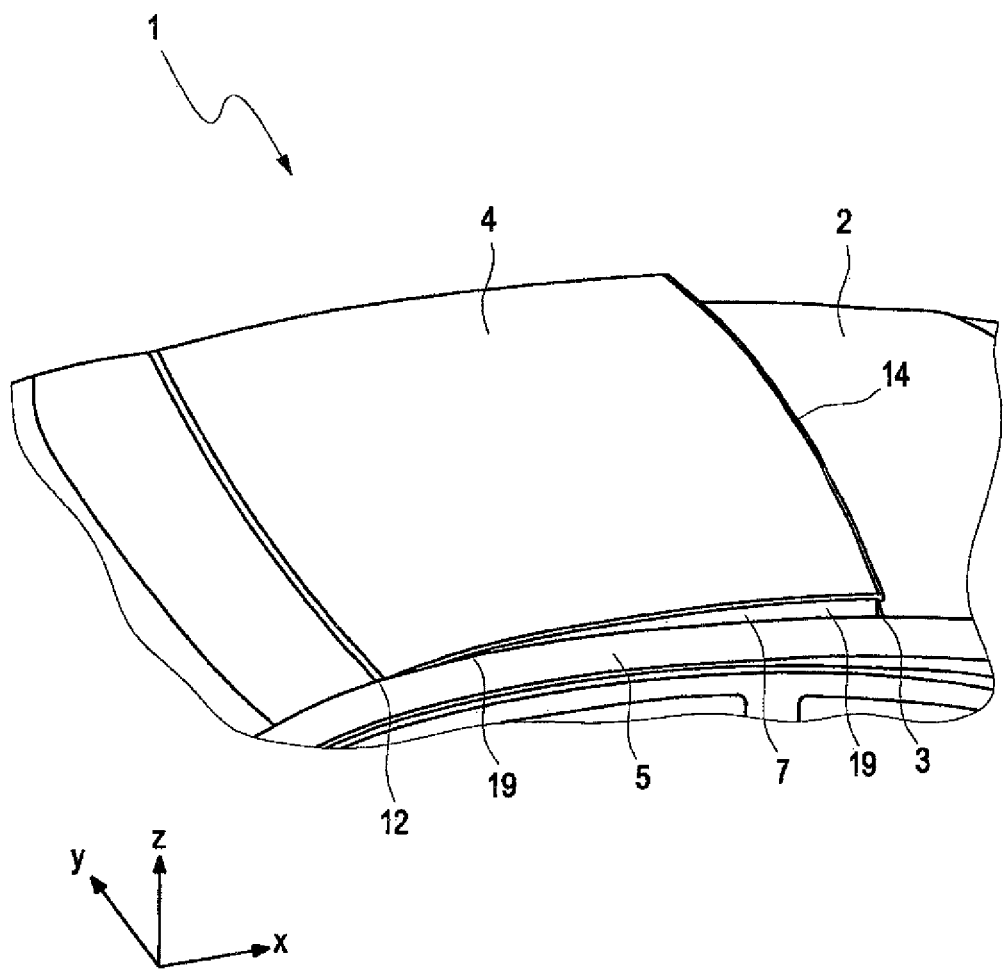
FIG. 1 a perspective illustration of an exemplary embodiment of a vehicle roof with a roof element and a side outer panel, FIG. 2 a sectional view of a portion of a side of the vehicle roof of FIG. 1 transversely to the vehicle longitudinal direction in a popped-up open position of the roof element, and FIG. 3 a sectional view of a portion of a side of the vehicle roof of FIG. 1 transversely to the vehicle longitudinal direction in a closed position of the roof element.

As is apparent from FIG. 1, the illustrated exemplary embodiment of a vehicle roof 1 of a motor vehicle is provided with a roof opening system, not shown in greater detail, and includes, for example, a fixed rear roof area 2 which is adjoined towards the front, i.e. in the direction of the vehicle front or in opposition to the vehicle longitudinal axis x, by a roof opening 3, which can selectively be closed or cleared, at least in part by a roof element 4. The roof element 4 is shown here in a popped-up state, a so-called venting position, in which a rear side 14 of the roof element 4 is popped-up, whereupon a full opening is realized by raising the roof element 4 and then moving it in the direction vehicle tail or in the direction of the vehicle longitudinal axis x. For optical reasons, a so-called rail-to-rail roof concept is implemented in which the roof element 4 extends from side wall frame 5 to side wall frame 5 or from roof pillar to roof pillar, without side panel on the vehicle roof 1. Provided on each of both sides of the roof element 4 is a side outer panel 7 in vehicle transverse direction y, which side outer panel is tilted away from the side wall frame 5 towards the roof element 4 or extends at an incline towards the vehicle vertical axis z and covers an otherwise present lateral gap between outside region 10 and a vehicle interior 11 of the vehicle. In accordance with the invention, the two side outer panels 7 are mounted for pivotal movement in vehicle longitudinal direction X. This is realized at at least two bearing points 19 on the frame, as indicated in FIG. 1. Viewed from a rotation point 12 for pop-up of the roof element 4 at the vehicle front, the side outer panel 7 extends in longitudinal direction to the rear side 14 of the roof element 4 and has a wedge shape with trough-shaped or bracket-shaped legs 8 that are slightly bent towards the vehicle interior 11 and shown in FIGS. 2 and 3 by way of a section view.

Figure 2:
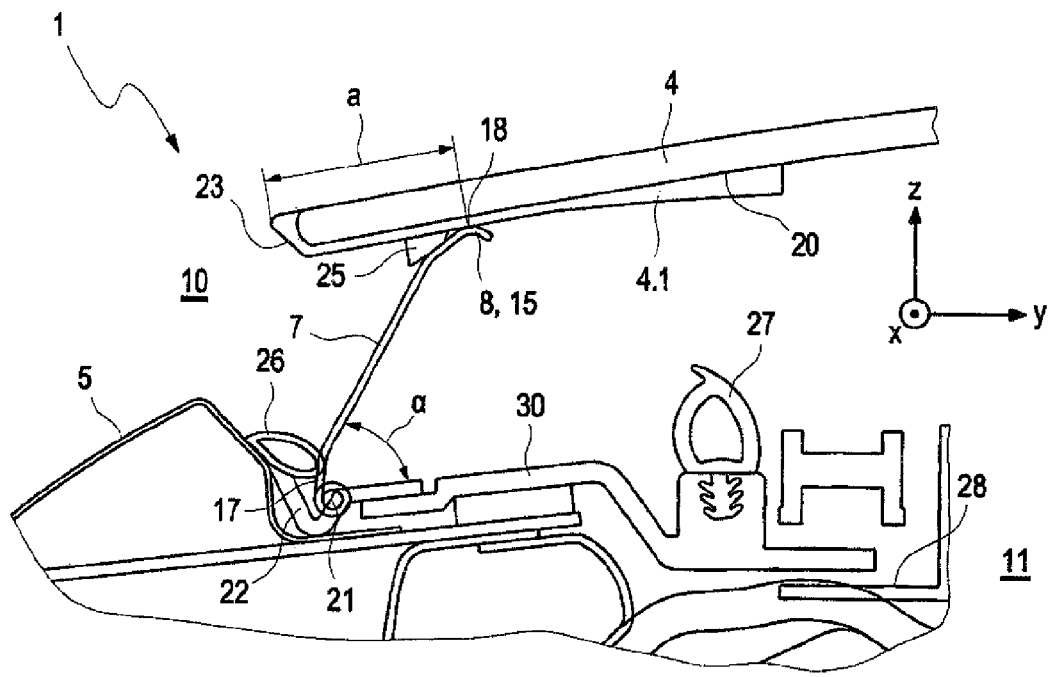

FIG. 2 shows a sectional view in vehicle transverse direction y of the vehicle roof 1 in a popped-up open position of the roof element 4 according to FIG. 1. FIG. 2 shows only a portion of one side of the vehicle roof 1 in more detail. The other side is a mirror image. The side outer panel 7 is preferably configured as a sheet metal part and/or plastic part and rests with a free, slightly bent end portion 15 or leg 8 upon an underside 20 of the roof element 4. The roof element 4 is configured in a known manner as a glass roof which is molded around by a PUR encapsulation 4.1 (PUR: polyurethane). The PUR encapsulation 4.1 provides a sliding surface of a contact zone 18 with respect to the side outer panel 7. When the roof element 4 is designed without PUR encapsulation 4.1, the sliding surface of a contact zone 18 with respect to the side outer panel 7 is realized by attaching, for example by bonding, a corresponding plastic part upon the underside 20 of the roof element 4. A rotary portion 17 of the side outer panel 7 in confronting relation to the side wall frame 5 forms a rotation axis 21 for the side outer panel 7 and is maintained under tension by a not shown spring member, for example a leaf spring or according to the principle of a torsion spring. Thus, a spring tension of the side outer panel 7 in the direction of the underside 20 of the roof element 4 is maintained so that a biasing force acts continuously from the free end portion 15 of the side outer panel 7 in the direction of the roof element 4. A seal 25 is attached in the area of the contact point of the free end portion 15 of the side outer panel 7 and seals the side outer panel 7 from the outside 10, when the roof element 4 is raised, but loses contact as soon as the roof element 4 is closed, so that a movement of the roof element 4 towards the vehicle roof 1 is not interfered with. Preferably, the seal 25 is formed as an elastic foam element and extends in the vehicle longitudinal direction x along the side outer panel 7. The elongate dimension in the vehicle longitudinal direction x of the seal 25 corresponds hereby substantially to the longitudinal dimension of the side outer panel 7. The roof element 4 is guided on both sides in a guide rail 28 and can be moved over the fixed roof region 2 to the rear in the direction vehicle tail. The roof element 4 thus represents an externally running sliding roof.

Figure 3:
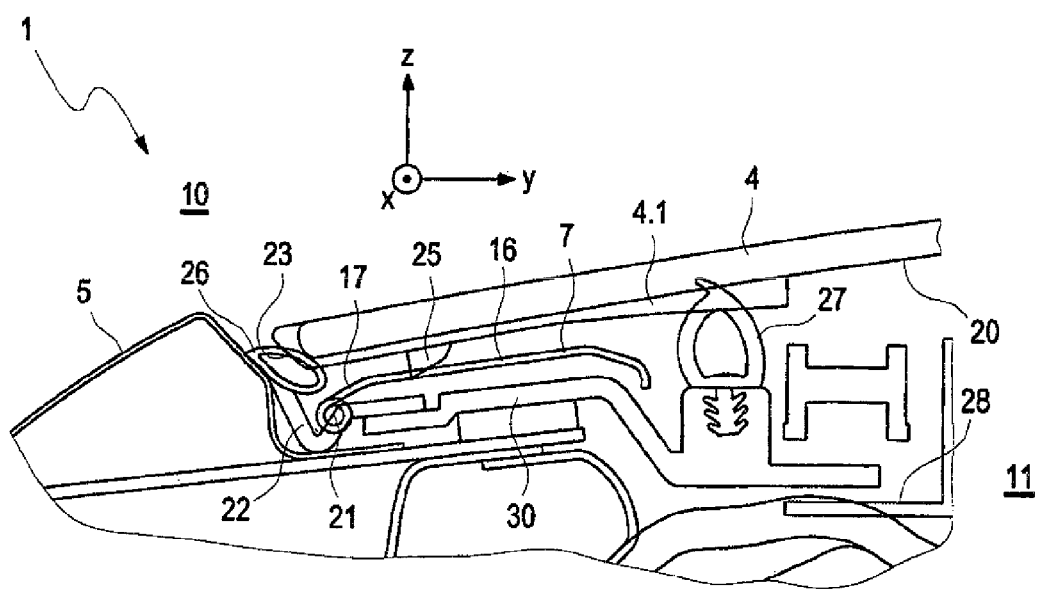

FIG. 3 shows a further sectional view in the vehicle transverse direction y of the vehicle roof 1 in a closed position of the roof element 4 of FIG. 1. FIG. 3 depicts only a portion of one side of the vehicle roof 1 in more detail. The other side is a mirror image. In the closed position, the side outer panel 7 is pressed under spring tension via the seal 25 upon the underside 20 of the roof element 4. The seal 25 is positioned on the roof element 4 in the closed position such that it can rest in the transition zone from a central portion 16 to the rotary portion 17 at the side outer panel 7. The seal 25 is provided substantially for noise reduction reasons. Depending on flow conditions and intended tilting angle, the provision of this seal 25 may also be omitted. It is also possible, to replace the foam seal 25 on the roof element 4 by a sealing lip on the side outer panel 7. This seal may then be produced, for example, from terpolymeric elastomer, such as EPDM (ethylene propylene diene rubber).

Acoustic tests have shown that it is advantageous to reduce noise by tilting the side outer panel 7 at a predetermined tilt angle $\alpha$, defined from the horizontal relative to the side outer panel 7, in the range of 50 to 70 degrees. It has been shown especially advantageous, when the angle $\alpha$ is approximately 60 degrees. The side outer panel 7 is hereby reliably rotated away, when the roof element 4 closes. Furthermore, an invisible stop is provided to limit the inclination angle $\alpha$ of the side outer panel 7 to a predetermined maximum opening angle of about 70 degrees. This prevents advantageously that the side outer panel 7 blocks or interferes with the corresponding closing movement, when closing the roof element 4. A point of articulation of the side outer panel 7 in the contact zone 4.1 on the underside 20 of the roof element 4 is hereby inwardly offset in the open state of the roof element 4 such that an overhang with a predefined distance a from an outer periphery 23 of the roof element 4 is established in the range of 20 to 40 mm. It has been shown advantageous, when a distance a or an overhang is 25 mm, with the distance a being measured in the tail section 14 or a trailing edge of the roof element 4. In the wind tunnel, it has been shown to be beneficial for noise generation, when the tiltable side outer panel 7 is inclined relative to the roof element 4 at a tilt angle $\alpha=60$ degrees and at the same time the overhang a is dimensioned up to 25 mm.

This solution offers advantages over a comparable bellows on the outer edge or on the outer periphery 23 of the roof element 4.

The bearing point for the side outer panel 7 is fixed to the frame and associated with the side wall frame 5, for which, for example, a trough-shaped element 22 is provided between side wall frame 5 and a mounting frame 30 for a sealing profile 27. The joint region between side wall frame 5 and the side outer panel 7 is sealed by a further, frame-fixed seal, designated in the following as a frame seal 26, with the frame seal 26 laterally surrounding the roof opening 3. In the illustrated exemplary embodiment, the frame seal 26 is placed via the trough-shaped element 22 upon the mounting frame 30. In addition or as an alternative, the frame seal 26 may be secured to the side outer panel 7 or on the side wall frame 5. The trough-shaped member 22 corresponds in the illustrated exemplary embodiment to a hard region of the frame seal 26. In the closed position, the roof element 4 rests with its underside 20 upon the frame seal 26. The frame seal 26 bearing upon the side wall frame 5 thus assumes the function of a joint seal between roof element 4 and side wall frame 5 for the closed roof element 4. Moreover, the frame seal 26 provides an acoustic seal for the tiltable side outer panel 7 in relation to the side wall frame 5, which side outer panel rests with its rotary portion 17 upon the frame seal 26 in the popped-up open position of the roof element 4. The frame seal 26 is locally cut out at the at least two bearing points 19, not shown in greater detail and indicated in FIG. 1, for the side outer panel 7. In the closed position of the roof element 4, the foam seal 25 rests against the side outer panel 7. The roof element 4 bears upon the frame seal 26 and the circumferential sealing profile 27, provided next to the guide rail 28. Since the side outer panel 7 is made of metal and thus is rigid, and does not quite coincide with the curvature of the side wall frame 5, the presence of the frame seal 26 is required to be able to compensate for such differences. To be able to better conform the side outer panel 7 to the curvature of the side wall frames 5, the side outer panel 7 may be made in several parts in a not shown exemplary embodiment.

The tiltable, spring-loaded, side outer panel 7 mounted for pivotal movement in the vehicle longitudinal direction x is attached in the illustrated exemplary embodiment to the mounting frame 30 and rotates about at least two pivot points or bearing points 19 from the inside 11 to the outside 10, when the roof element 4 pops up. As an alternative, the bearing points 19 may be arranged on the side wall frame 5. After pop-up of the roof member 4, the roof element 4 can be moved to the rear in the direction of the vehicle tail, wherein the side outer panel 7 remains stationary and the roof element 4 partly moves away or detaches from the side outer panel 7. As the side outer panel 7 is fixed to the mounting frame 30, a very compact design becomes possible.

The invention claimed is:

1. A vehicle roof, comprising:
   a side wall frame;
   a roof element movable between an open position in which an elastic roof opening is cleared and a closed position in which the roof opening is closed;
   a side outer panel configured to cover a lateral gap between the roof element and the side wall frame in the open position of the roof element, said side outer panel being mounted for pivotal movement in a vehicle longitudinal direction; and
   a seal arranged between the roof element and the side outer panel such that said side outer panel resting laterally on the seal in the open position of the roof element.

2. The vehicle roof of claim 1, wherein the roof element has a contact zone configured to define a sliding surface, said side outer panel resting on the contact zone.

3. The vehicle roof of claim 2, wherein the roof element has a plastic component which forms the contact zone.

4. The vehicle roof of claim 1, wherein the side wall frame has at least two bearing points which are spaced from one another in the vehicle longitudinal direction and configured to support the side outer panel.

5. The vehicle roof of claim 1, further comprising a mounting frame having at least two bearing points which are spaced from one another in the vehicle longitudinal direction and configured to support the side outer panel.

6. The vehicle roof of claim 1, wherein the side outer panel is tilted in the open position of the roof element at an incline relative to a horizontal at an angle in a range of 50 to 70 degrees.

7. The vehicle roof of claim 1, wherein the side outer panel is tilted in the open position of the roof element at an incline relative to a horizontal at an angle of approximately 60 degrees.

8. The vehicle roof of claim 1, wherein the side outer panel rests in the open position of the roof element upon an underside of the roof element at a distance from an outer periphery of the roof element.

9. The vehicle roof of claim 8, wherein the distance is in a range of 20 to 40 mm.

10. The vehicle roof of claim 8, wherein the distance is approximately 25 mm.

11. The vehicle roof of claim 1, wherein said seal is secured to an underside of the roof element.

12. The vehicle roof of claim 11, wherein the seal is formed as an elastic foam element.

13. The vehicle roof of claim 1, further comprising a frame seal provided between the side wall frame and the side outer panel.

14. The vehicle roof of claim 13, wherein the frame seal is configured to seal against the side outer panel and the side wall frame in the open position of the roof element, and to seal against an outer periphery of the roof element and the side wall frame in the closed position of the roof element.

15. The vehicle roof of claim 13, wherein the frame seal is arranged on the side wall frame.

16. The vehicle roof of claim 13, further comprising a mounting frame, said frame seal is arranged on the mounting frame.

17. The vehicle roof of claim 1, wherein the side outer panel is configured as a one-piece sheet-metal part and/or plastic part.

18. The vehicle roof of claim 1, further comprising a first member arranged on an upper side of the mounting frame and a second member arranged on a lower side of the roof element, said seal is located between the side outer panel and the second member arranged on the lower side of the roof element, further comprising another seal arranged between the side outer panel and the first member arranged on the upper side of the mounting frame.

* * * * *